United States Patent
Bosworth et al.

(10) Patent No.: US 8,156,471 B2
(45) Date of Patent: Apr. 10, 2012

(54) MULTI-LANGUAGE EXECUTION METHOD

(75) Inventors: Adam Bosworth, Mercer Island, WA (US); David Bau, III, Gladwyne, PA (US); Kenneth Eric Vasilik, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1841 days.

(21) Appl. No.: 10/089,139

(22) PCT Filed: Nov. 9, 2001

(86) PCT No.: PCT/US01/46928
§ 371 (c)(1),
(2), (4) Date: Aug. 19, 2002

(87) PCT Pub. No.: WO02/39647
PCT Pub. Date: May 16, 2002

(65) Prior Publication Data
US 2004/0040011 A1    Feb. 26, 2004

Related U.S. Application Data

(60) Provisional application No. 60/246,915, filed on Nov. 10, 2000, provisional application No. 60/246,916, filed on Nov. 10, 2000.

(51) Int. Cl.
*G06F 9/44* (2006.01)
(52) U.S. Cl. ................ 717/114; 717/117; 717/119
(58) Field of Classification Search .............. 717/154, 717/143, 136, 131, 114–119, 146, 144, 148; 709/315, 203; 707/1, 3; 705/37; 704/2; 715/513
See application file for complete search history.

(56) References Cited

U.S. PATENT DOCUMENTS

| | | | | |
|---|---|---|---|---|
| 5,428,792 A * | 6/1995 | Conner et al. | ............... | 717/143 |
| 5,428,793 A * | 6/1995 | Odnert et al. | ................. | 717/157 |
| 5,586,330 A * | 12/1996 | Knudsen et al. | ............. | 717/136 |
| 5,590,331 A * | 12/1996 | Lewis et al. | .................... | 717/144 |
| 5,630,137 A | 5/1997 | Carney et al. | | |
| 5,845,121 A * | 12/1998 | Carter | ........................... | 717/131 |
| 5,946,487 A * | 8/1999 | Dangelo | ....................... | 717/148 |
| 6,066,181 A | 5/2000 | DeMaster | | |
| 6,167,565 A * | 12/2000 | Kanamori | ..................... | 717/146 |
| 6,292,936 B1 * | 9/2001 | Wang | ............................ | 717/115 |
| 6,339,839 B1 | 1/2002 | Wang | | |
| 6,546,477 B1 * | 4/2003 | Russo et al. | ................. | 711/170 |
| 6,732,330 B1 * | 5/2004 | Claussen et al. | ............. | 715/513 |

(Continued)

OTHER PUBLICATIONS

Kind et al., Multi-lingual threading, IEEE, Jan. 21-23, 1998 pp. 431-437.*

(Continued)

*Primary Examiner* — Wei Zhen
*Assistant Examiner* — Satish Rampuria
(74) *Attorney, Agent, or Firm* — Squire Sanders (US) LLP

(57) ABSTRACT

A data processing representation is expressed in the form of code sections, which may be nested, using multiple programming languages. The representation is read by an execution engine. The execution engine identifies the language of each code section, and a corresponding language specific processing unit is invoked to process the code section. The processing unit reads that section, identifying sub-sections specified in it's associated language and other sub-sections specified in unknown languages. It executes the sub-sections specified in its associated language with the intended semantics and in the appropriate order. When a sub-section specified in an unknown language is encountered, it delegates processing of that sub-section back to the execution engine, which repeats this process for the unknown sub-section. The execution result is returned back to the requesting language specific processing unit, which continues processing from where it left off.

35 Claims, 6 Drawing Sheets

U.S. PATENT DOCUMENTS

| | | | |
|---|---|---|---|
| 2002/0073399 A1* | 6/2002 | Golden | 717/114 |
| 2002/0099867 A1* | 7/2002 | Wilkinson et al. | 709/315 |
| 2002/0129000 A1* | 9/2002 | Pillai et al. | 707/1 |
| 2002/0184308 A1* | 12/2002 | Levy et al. | 709/203 |
| 2002/0188547 A1* | 12/2002 | Banerjee et al. | 705/37 |
| 2003/0121000 A1* | 6/2003 | Cooper et al. | 715/513 |
| 2004/0049374 A1* | 3/2004 | Breslau et al. | 704/2 |
| 2004/0177062 A1* | 9/2004 | Urquhart et al. | 707/3 |
| 2008/0066059 A1* | 3/2008 | Pugh et al. | 717/125 |

OTHER PUBLICATIONS

Ansari et al., Executing multidatabase transactions, IEEE, Jan. 7-10, 1992 pp. 335-346 vol. 2.*

DiNitto, Future directions in programming languages, IEEE, Oct. 9-13, 1988 pp. 169-176.*

Wallace, et al., "Haskell and XML: Generic Combinators or Type-Based Translation?", ACM Sep. 1999, pp. 148-159.

* cited by examiner

MULTI-LANGUAGE EXECUTION METHOD

RELATED APPLICATIONS

This non-provisional application is related to and claims priority to provisional application No. 60/246,915, entitled "A Data Processing Method Employing Cell Based Data Flow Description", and application No. 60/246,916, entitled "A Multi-Language Execution Method", both filed on Nov. 10, 2000, and both specifications are hereby fully incorporated by reference.

BACKGROUND OF THE INVENTION

1. Field of the Invention

The present invention relates to the field of data processing. More specifically, the present invention relates to the employment of multiple programming languages interleaved within a single source file for data processing operations.

2. Background Information

Ever since the invention of the first computer, computer scientists have continuously tried to improve the productivity of programmers, such that more applications can be developed using fewer resources to take advantage of the continuous advancements being made in the art of computer and related technologies. First assembler languages were developed to replace machine languages. Then, high level languages, such as FORTRAN, COBOL, PL/I and so forth, were developed to further improve the productivity of programmers. Development of high level languages were followed by structured languages such as Pascal and C, and then object oriented programming languages such as C++. To facilitate development of the Internet and the World Wide Web, "new" languages such as the Hypertext Markup Language (HTML), Java™, Javascript, Perl and CGI were developed.

Each programming language has its strength and weakness, and is often suitable for certain applications over other applications. It is often desirable to be able to employ instructions or statements of different programming languages to solve a problem or implement an application. However, few programming languages offer such support. To the extent that mixed language execution is supported, the approach is often proprietary and not extendable to other programming languages. Thus, an improved mixed multi-language method, especially, one that is extensible to multiple programming languages is desired.

SUMMARY OF THE INVENTION

A data processing representation is expressed in the form of code sections, which may be nested, using multiple programming languages. The representation is read by an execution engine. The execution engine identifies the programming language of each code section, and a corresponding language specific processing unit is invoked to process the code section. The language specific processing unit reads that section of the representation, identifying sub-sections specified in its associated language and other sub-sections specified in unknown languages. It executes the sub-sections specified in its associated language with the intended semantics and in the appropriate order. When a sub-section specified in an unknown language is encountered, it delegates processing of that sub-section back to the execution engine, which repeats this process for the unknown sub-section. The execution engine coordinates execution of the unknown sub-section, using one or more appropriate language specific processing units, and returns the result back to the requesting language specific processor, which will continue processing where it left off.

In one embodiment, a header section comprising directive and/or declarative statement is also supported for one or more of the languages. Upon recognition, the corresponding language specific processing unit imports data packages enumerated by the directive statement, as directed, or instantiate methods/variables enumerated by the declarative statement, for code sections of the language, as declared.

In one embodiment, the mixed usage of at least three programming languages is supported. The first language is an XML-like declarative language, the second language is the Java™ language and the third language is XML.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a method for specifying data processing operations using programming instructions of multiple programming languages, and for executing the multi-language data processing representation.

In the following description, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without the specific details. In other instances, well known features are omitted or simplified in order not to obscure the present invention.

Parts of the description will be presented in data processing terms, such as data, variables, methods, import, retrieve, return, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical, electrical and/or optical components of a computer system. The term computer system includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

Overview

Figure 1:
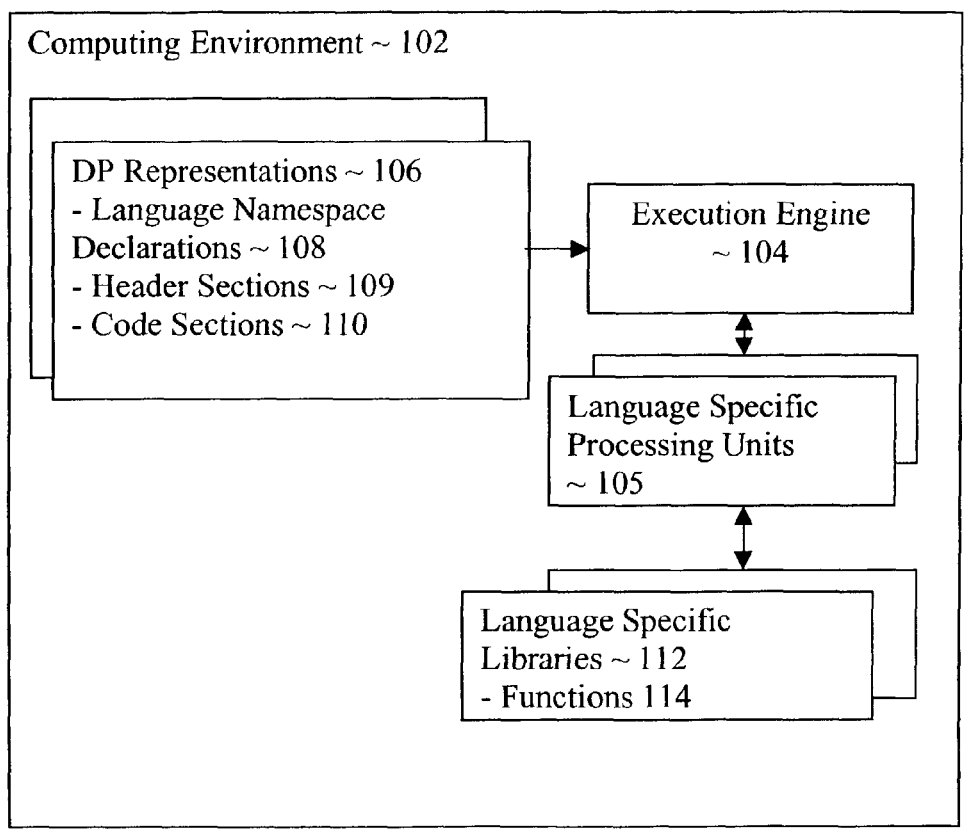
FIG. 1 illustrates an overview of the multi-language execution method of the present invention, in accordance with one embodiment.

Referring now to FIG. 1, wherein a block diagram illustrating an overview of the multi-language execution method of the present invention, in accordance with one embodiment. As illustrated, in accordance with the present invention, a computing environment 102 is provided with an execution engine 104, supplemented with a number of language specific processing units 105, to facilitate execution of data processing representations 106 expressed with programming instructions of multiple programming languages. For the embodiment, computing environment 102 is also provided with function libraries 112 of the programming languages.

As illustrated, in accordance with the embodiment, a multi-language data processing representation 106 includes one or more language namespace declarations 108 declaring language or languages employed, and one or more code sections 110 of the declared languages. In other embodiments, other non-namespace means may also be employed to declare the languages involved. As will be described in more detail below, each code section 110 may include sub-sections written in one or more other languages, that is code sections 110 of the different programming languages may be interleaved. Each sub-section may in turn have sub-sub-sections written in other languages, and so forth.

For the embodiment, data processing representation 106 may also include one or more language specific header sections 109 specifying various "preliminary" matters for subsequent code sections 110 of the language.

Execution engine 104 is endowed with logic to anticipate that data processing representations 106 may include code sections of different programming languages, and with the assistance of language specific processing units 105 be able to handle and facilitate execution of these code sections of different programming languages. Moreover, execution engine 104 is endowed with logic to anticipate and handle intermixing of code sections of the different programming languages. For the embodiment, upon encountering a code section/statement of a language, execution engine 104 invokes the corresponding language specific processing unit 105 to augment and provide the language specific processing required to process and facilitate execution of the code section/statement.

Language specific processing units 105 are endowed with logic to identify sub-sections written in unknown programming languages, and delegate the processing of those sub-sections back to the execution engine 104. The execution engine 104, in turn, will pass the sub-section to an appropriate language specific processor and return the result to the requesting language specific processing unit 105.

In general, except for the teachings of the present invention incorporated in execution engine 104 and language specific processing units 105, and the exploitation of these abilities by data processing representations 106, data processing representations 106 are intended to represent a broad range of data processing representation methodologies known in the art, and execution engine 104 is intended to represent a broad range of the corresponding engines in support of these methodologies. Further, computing environment 102 may be disposed in a single or multi-processor system, or a collection of networked systems. In the case of networked systems, the systems may be networked locally, or across a number of private and/or public networks, including the Internet.

Mixed Language Data Processing Representation

Figure 4:
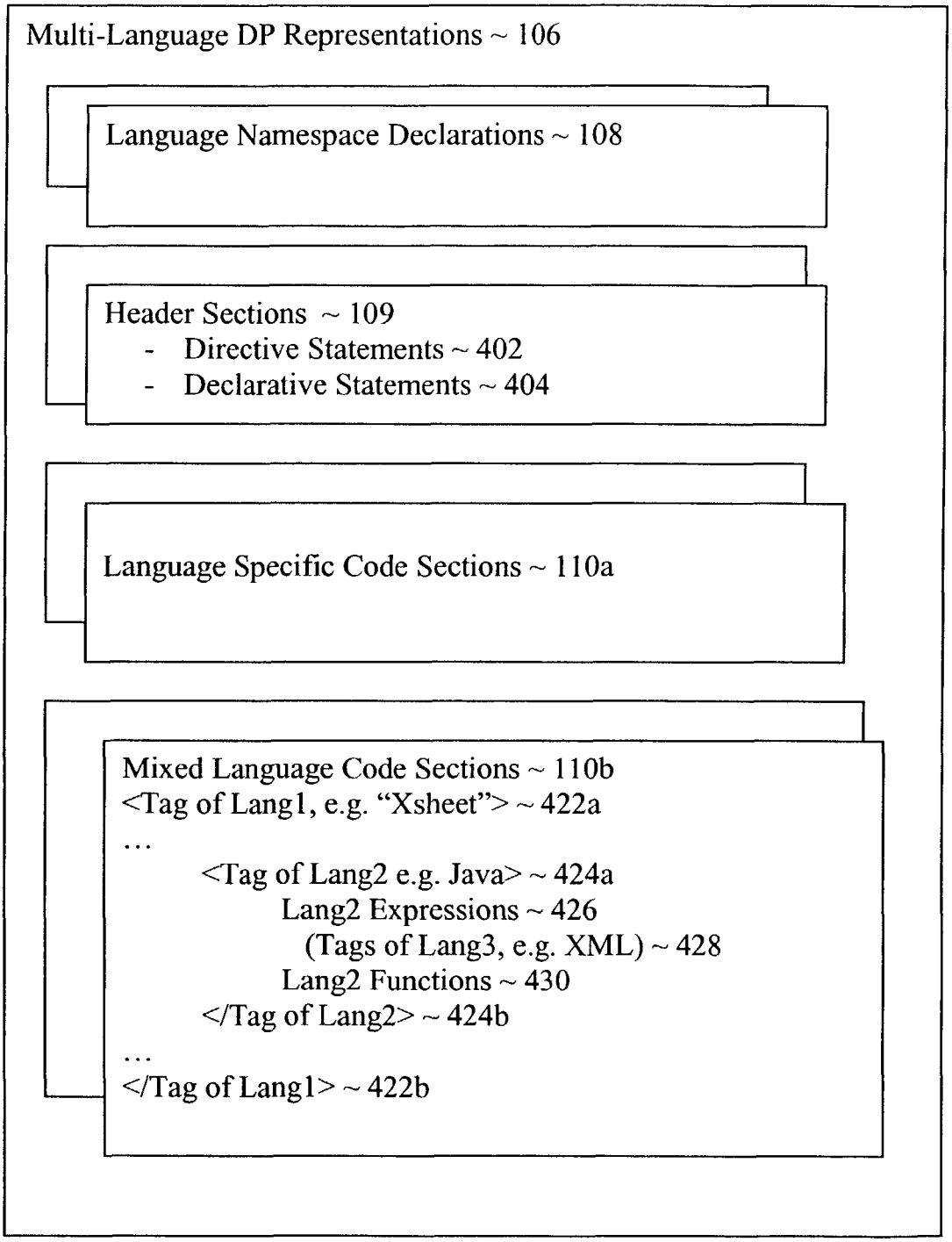
FIG. 4 illustrates a multi-language data processing representation of FIG. 1, in further detail in accordance with one embodiment.

Referring now to FIG. 4, wherein a block diagram illustrating a mixed language data process representation 106 of FIG. 1 in further details, in accordance with one embodiment is shown. As illustrated, and described earlier, for the embodiment, data processing representation 106 includes one or more language namespace declarations 108 declaring one or more languages employed. In one embodiment, declarations 108 are expressed in accordance with the following exemplary syntax:

<xs:xsheet xmlns:xs="Error! Hyperlink reference not valid.xl://crossgain.net/lang/xsheet/"
xmlns:java="xl://crossgain.net/lang/java/">
where "xmlns" declares an XML namespace,
"xl://crossgain.net/lang/xsheet/" is a namespace using a specially formed URI identifying one language that may be used in this source. The execution engine uses this URI to locate an appropriate language specific processing unit for sections written in this language.
"xl://crossgain.net/lang/java/" is a specially formed URI identifying a second language that may be used in this source (an extension of the well known Java™ language in this example). The execution engine uses this URI to locate an appropriate language specific processing unit for sections written in this language.
"xs" is a namespace prefix used to identify sections of the source written in the language identified by the associated namespace, "xl://crossgain.net/lang/xsheet/"
"java" is a namespace prefix used to identify sections of the source written in the language identified by the associated namespace, "xl://crossgain.net/lang/java/"

Cell based data processing is described in U.S. patent application Ser. No. 09/741,219, entitled "Cell Based Data Processing", filed on Dec. 19, 2000, which is a non-provisional application of the earlier enumerated U.S. provisional patent application 60/246,915. Readers are referred to the '219 application for further details.

For ease of understanding, the remaining description of the present invention will be presented primarily in the context of the aforementioned "cell based" methodology/language and the extension of the Java™ language, the present invention is not so limited. The present invention may be practiced with any two or more currently known or to be developed languages, as long as each of the languages is amenable to the declaration and reference techniques described in further details below.

Continuing to refer to FIG. 4, and as alluded earlier, for the embodiment, data processing representation 106 further includes a number of language specific header sections 109 of selected supported languages. For the embodiment, each header section 109 may include one or more directive statements 402 directing one or more preliminary or preparatory actions, such as importing of data packages, to be performed, and one or more declarative statements 404 declaring one or more processing methods or instance variables to be instantiated for use by subsequent code sections 110 of the language.

In one embodiment, a header section 109 may be declared in accordance with the following exemplary syntax:

<xs:header>
<java:directive>
  import org.w3c.dom.*;
</java:directive>
</xs:header>

The above example directive directs the import of W3C's definition of the document object model for use by subsequent Java™ code sections.

Still referring to FIG. 4. as described earlier, data processing section 106 further includes language specific as well as mixed language code sections 110a and 110b. For the embodiment, statements of a second language may be intermixed among statement of a first language, employing one or more sets of delimiting language tag pairs 442a-442b and 444a-444b as shown.

For example, from within Java™, retrieval and return of a XML value associated with an xsheet variable as an object may be specified as follows:

myvar=<xs:valueof select="$countdown"/>;

The XML value identified by the current value of the xsheet variable "countdown" is retrieved and returned as an object for use in a Java™ expression. In contrast, consider the following example where the xsheet code is used as a statement instead of part of an expression:

for (int j=0; j<10; j++) {
<xs:value-of select="$countdown"/>;
}

In this case, the Java™ specific processing unit asks the execution engine to evaluate the xsheet code 10 times. Each time, the results returned by the execution engine are appended to the output of the delimited code section.

As illustrated, for the embodiment, statements within the delimited code section may also invoke one or more local, remote or built-in library functions of the language. In one embodiment, the built-in library functions supported for the example Java™ language include a) an emit( ) function for converting Java™ Objects to XML form and appending the resulting value of the function to output of the delimited code section;

b) a push(element) function to append a copy of a specified element to the output of the delimited code section and reposition the insertion point for the delimited code section inside the element such that subsequent output of the delimited code section is appended as children of this element;

c) a pop( ) function to "back up" the current insertion point for the delimited code section such that subsequent output of the delimited code section is appended as children of the parent of the element containing the current insertion point; and d) a getDocument( ) function to retrieve and return a W3C document object for the delimited code section, for use as a space in which new nodes may be created.

Execution Engine

Figure 2A:
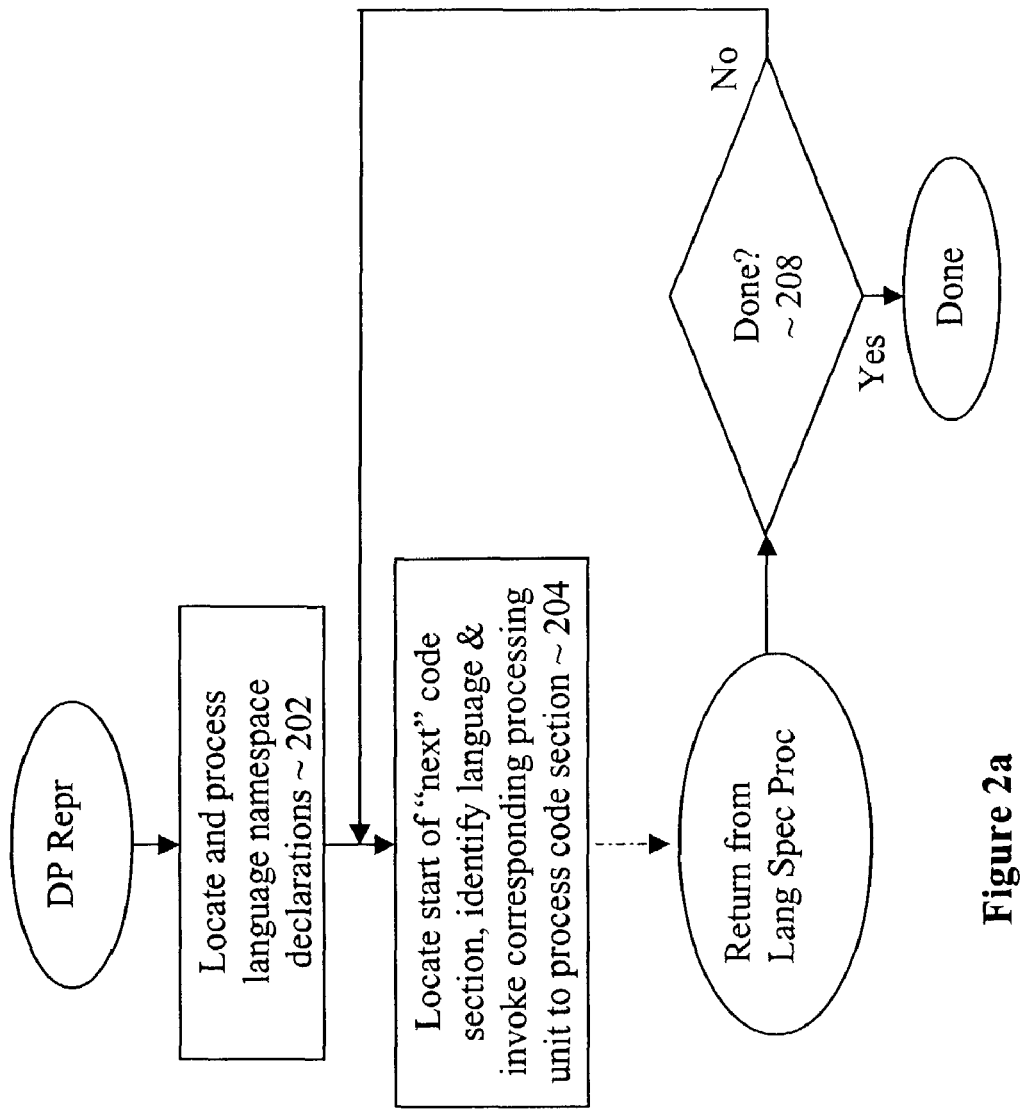
FIG. 2a illustrates the relevant operational flow of the execution engine of FIG. 1, in accordance with one embodiment.

FIG. 2a illustrates the operational flow of the relevant aspects of execution engine 104 in accordance with one embodiment; more specifically, the operational flow of execution engine 104 for processing data processing representation 106. The embodiment, assumes, execution engine 104, like other conventional execution engines of prior art data processing representations, upon invocation, would parse and interpret the statements of data processing representation 106.

As illustrated, for the embodiment, execution engine 104 first locates and processes the declaration statements declaring the programming languages employed in expressing the data processing representation being processed, block 202. Next, execution engine 104 locates the start of the "next" code section, identifies the language associated with code section, and as described earlier, invoke the corresponding language specific processing unit to process the code section, block 204.

Upon return of execution control, execution engine 104 determines whether end of execution has been reached, block 208, if not, execution engine 104 continues the process at block 204 again, i.e. determining the language of the "next" code section, and invoke the corresponding language specific processing unit to process the "next" code section.

The process continues until eventual execution control is returned where end of execution has been reached.

Language Specific Processing Unit

Figure 2B:
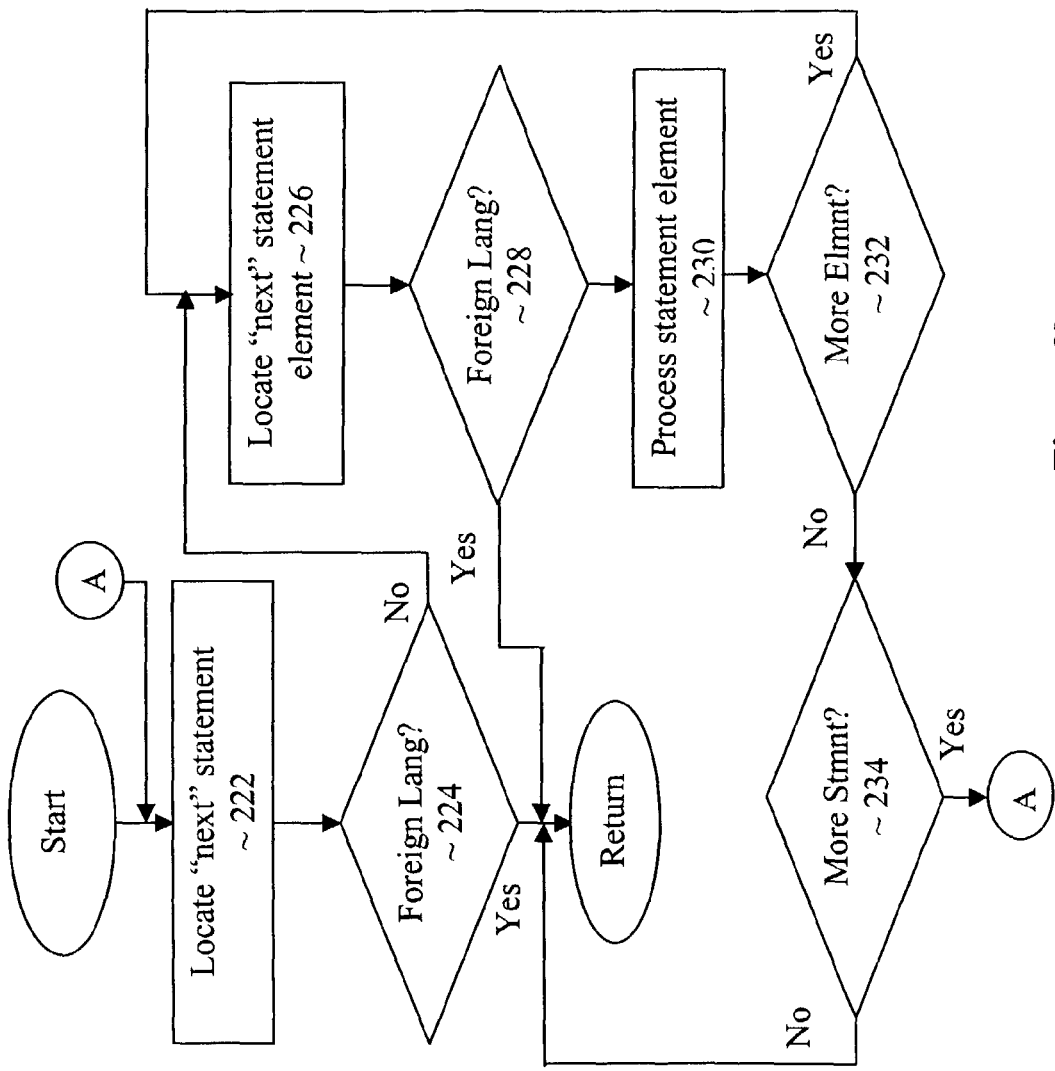
FIG. 2b illustrates the relevant operational flow of a language specific processing unit of FIG. 1, for processing a code section of the language, in accordance with one embodiment.

FIG. 2b illustrates the operational flow of the relevant aspects of a language specific processing unit 105 for processing a non-header code section of the language, in accordance with one embodiment. As illustrated, for the embodiment, the processing unit first locates the "next" statement to be executed, block 222. Upon locating the "next" statement, the processing unit determines if it is a statement of the language or of an unknown language (e.g. the start of a language tag of a sub-section of another language), block 224. If it is a statement of an unknown language, as described earlier, the processing unit invokes the execution engine recursively allowing it to evaluate the foreign language section with the other language specific processing units at its disposal.

If it is a statement of the language the language processor the statement elements accordingly, starting with a next statement element, block 226. Again, the processing unit determines if the statement element is an element recognized within the language or it's an element of an unknown language (e.g. the start of a language tag of a sub-section of another language), block 228. If it is an element of an unknown language, as described earlier, the processing unit invokes the execution engine recursively.

If it is an element recognized by the language, the processing unit processes the element accordingly, block 230. As described earlier, in one embodiment, the language element may be an invocation invoking a library function of the language. If so, the library function is invoked and executed accordingly. The library function may be local or remote, and invoked in a namespace based approach. Invocation of function in a namespace based approach is the subject matter of Patent Cooperation Treaty (PCT) patent application number US01/46712, entitled "Namespace Based Function Invocation", contemporaneously filed, and published on May 16, 2002, which claims priority to the earlier enumerated U.S. provisional patent application 60/246,916. PCT Application US01/46712 Application has subsequently entered the U.S. National Stage, application Ser. No. 10/089,139. Readers are referred to the PCT US01/46712 or U.S. Ser. No. 10/089,139 application for further details.

Still referring to FIG. 2b, thereafter, at block 232, the processing unit determines if end of statement has been reached. If not, it continues operation at block 226 again. If end of statement has been reached, the processing unit determines if there are additional statements to be processed, block 234. If so, it continues operation at block 222 again. Otherwise, it returns execution control back to the execution engine.

Figure 2C:
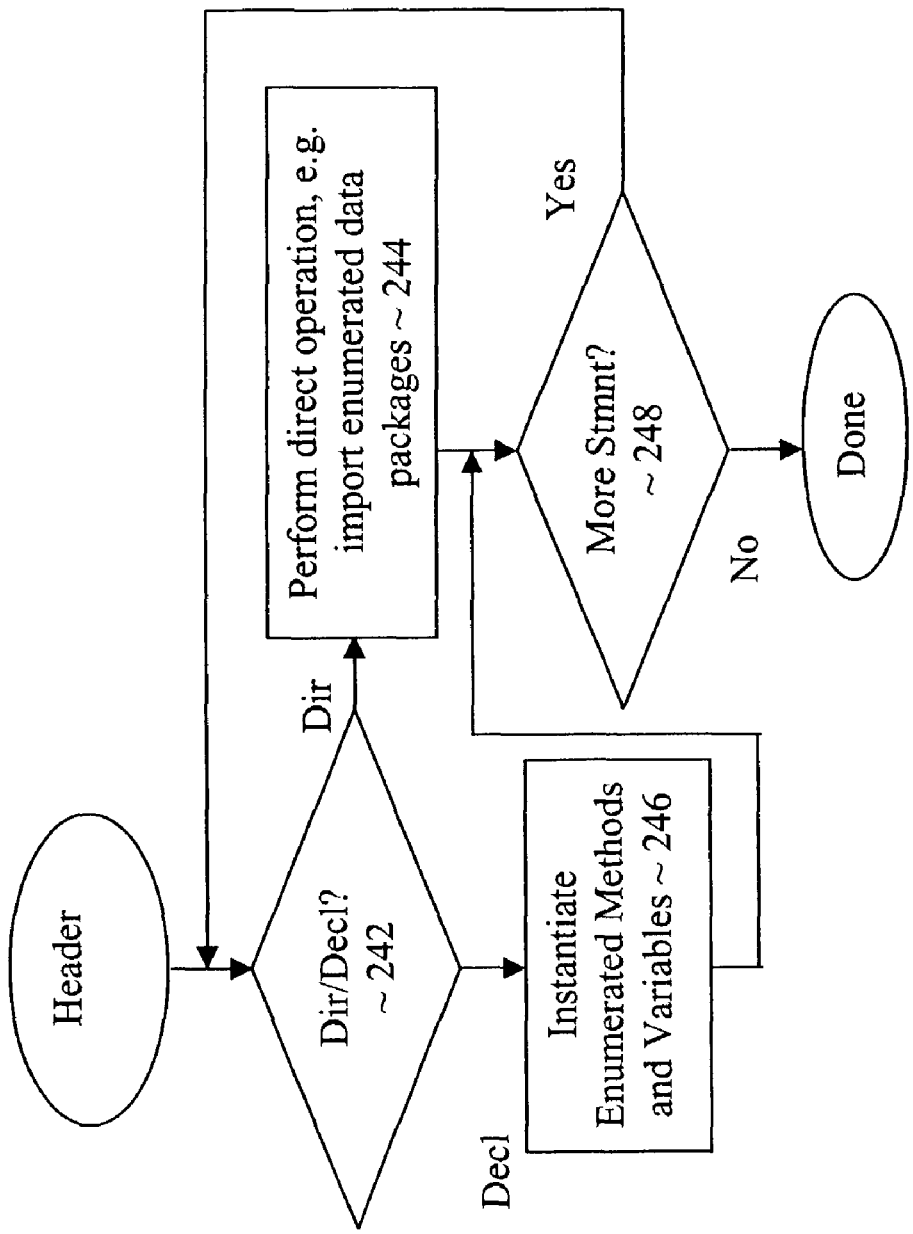
FIG. 2c illustrates the relevant operational flow of a language specific processing unit of FIG. 1, for processing a header section of the language, in accordance with one embodiment.

FIG. 2c illustrates the operational flow of the relevant aspects of a language specific processing unit 105 for processing a header section of the language, in accordance with one embodiment. More specifically, the embodiment is the embodiment in support of the Java™ language, incorporating the earlier described features. Other language specific processing units 105 in support of other languages may be likewise implemented with or without modifications and alterations.

As illustrated, upon invocation, the exemplary processing unit 105 determines if it is processing a directive or a declarative statement, block 232. If it is a directive statement being processed, the exemplary processing unit 105 performs the specified operation, e.g. an import operation importing enumerated data packages, as directed, block 234. On the other hand, if it is a declarative statement being processed, the exemplary processing unit 105 processes the declaration, e.g. instantiating a declared processing method or an instance variable, as declared, block 236.

The process continues as earlier described, block 238, until all statements of the header section are processed.

Example Computer System

Figure 3:
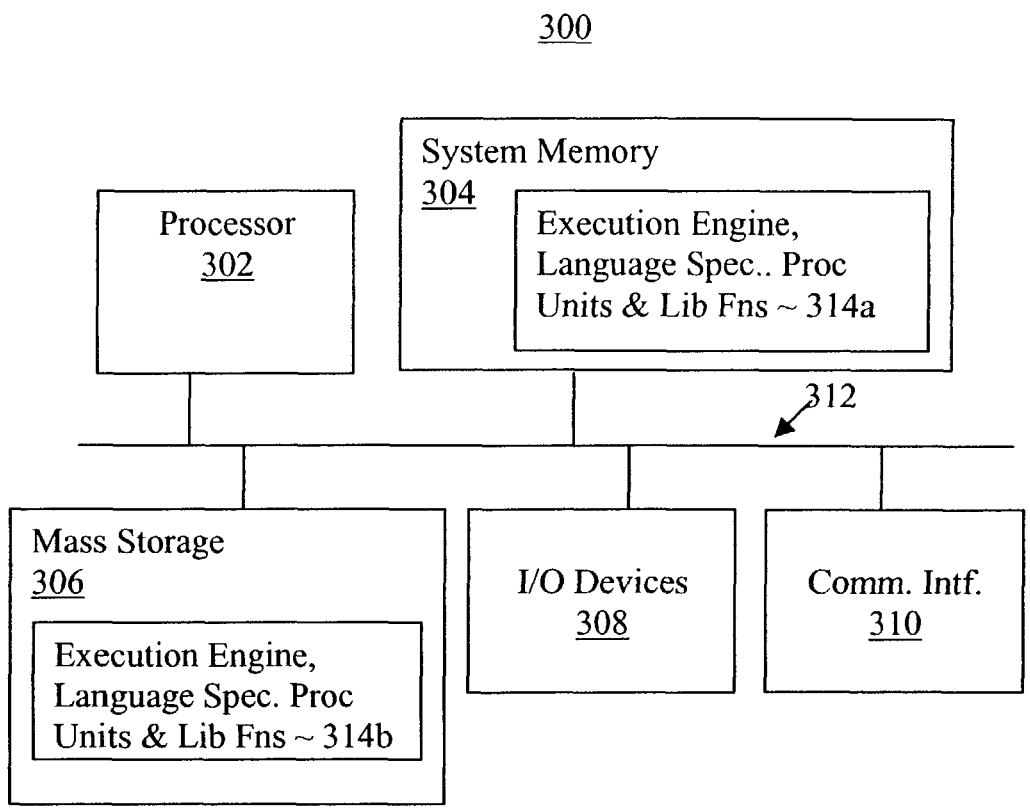
FIG. 3 illustrates a computer system suitable for use to practice the present invention, in accordance with one embodiment.

FIG. 3 illustrates a computer system suitable for use to practice the present invention, in accordance with one embodiment. As shown, computer system 300 includes one or more processors 302 and system memory 304. Additionally, computer system 300 includes mass storage devices 306 (such as diskette, hard drive, CDROM and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown). Each of these elements performs its conventional functions known in the art. In particular, system memory 304 and mass storage 306 are employed to store a working copy and a permanent copy of the programming instructions implementing the execution engine and the language specific processing units. The permanent copy of the programming instructions may be loaded into mass storage 306 in the factory, or in the field, through a distribution medium (not shown) or through communication interface 310 (from a distribution server (not shown). The constitution of these elements 302-312 are known, and accordingly will not be further described.

Conclusion and Epilogue

Thus, it can be seen from the above descriptions, a novel method and apparatus for processing and facilitating execution of data processing representations encoded using multiple programming languages has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method of computing comprising:
    reading, by an execution engine, a data processing representation having code sections with code statements of at least a first and a second programming language;
    recognizing, by the execution engine, a first code section with at least code statements of a first programming language;
    invoking, by the execution engine, a first code statement processing unit of the first programming language to process the first code section;
    invoking, by the execution engine, a second code statement processing unit of a second programming language to process a code statement, when the first code statement processing unit locates a code statement of the second programming language within the first code section, and invokes the execution engine recursively;
    recognizing, by the execution engine, a second code section with at least code statements of the second programming language;
    invoking, by the execution engine, the second code statement processing unit of the second programming language to process the second code section; and
    invoking, by the execution engine, the first code statement processing unit of the first programming language to process a code statement, when the second code statement processing unit locates a code statement of the first programming language within the second code section, and invokes the execution engine recursively;
    wherein the code statement of the second programming language within the first code section, and the code statement of the first programming language within the second code section, are both within the data processing representation; and
    recognizing a header section of a selected one of the first and the second programming language;
    recognizing a declare statement within the header section, enumerating one or more instance variables; and
    instantiating the enumerated one or more instance variables for use within code sections with at least statements of the selected first and second programming language.

2. The method of claim 1, wherein the first and second code sections are non-interleaved code sections.

3. The method of claim 1, wherein said second code section is embedded within said first code section.

4. The method of claim 1, wherein said first language is a directive language, and said second language is a selected one of XML and an object-oriented language.

5. The method of claim 1, wherein said first language is an object-oriented language, and said second language is XML.

6. The method of claim 1, wherein the method further comprises
    recognizing a third code section with at least code statements of a third programming language; and
    invoking a third code statement processing unit of the third programming language to process the third code section.

7. The method of claim 6, wherein said third code section is embedded within said second code section, and said second code section is embedded within said first code section.

8. The method of claim 6, wherein said first language is a directive language, said second language is an object-oriented language, and said third language is XML.

9. The method of claim 1, wherein the method further comprises
    recognizing an invocation of a library function within at least a selected one of said first and second code sections; and invoking the library function, and outputting the result of the invocation.

10. The method of claim 9, wherein the library function is a selected one of an emit function for outputting execution results, a pop function for returning an element, and a push function for backing up an insertion point.

11. The method of claim 1, wherein the method further comprises
recognizing a header section of a selected one of the first and the second programming language;
recognizing a directive statement within the header section, enumerating one or more data packages; and
importing the enumerated one or more data packages for use within code sections with at least statements of the selected first and second programming language.

12. The method of claim 1, wherein the method further comprises
recognizing a header section of a selected one of the first and the second programming language;
recognizing a declare statement within the header section, enumerating one or more processing methods; and
instantiating the enumerated one or more processing methods for use within code sections with at least statements of the selected first and second programming language.

13. An apparatus comprising:
at least one storage unit having stored thereon programming instructions designed to instantiate an execution engine to enable the apparatus to
read, by the execution engine, a data processing representation having code sections with code statements of at least a first and a second programming language,
recognize, by the execution engine, a first code section with code statements of at least the first programming language,
invoke, by the execution engine, a first code statement processing unit of the first programming language to process the first code section,
invoke, by the execution engine, a second code statement processing unit of a second programming language to process a code statement, when the first code statement processing unit locates a code statement of the second programming language within the first code section, and invokes the execution engine recursively;
recognize, by the execution engine, a second code section with code statements of at least the second programming language,
invoke, by the execution engine, a second code statement processing unit of the second programming language to process the second code section,
invoke, by the execution engine, the first code statement processing unit of the first programming language to process a code statement, when the second code statement processing unit locates a code statement of the first programming language within the second code section, and invokes the execution engine recursively;
wherein the code statement of the second programming language within the first code section, and the code statement of the first programming language within the second code section, are both within the data processing representation; and
wherein said programming instructions are further designed to enable the apparatus to recognize a header section of a selected one of the first and the second programming language;
recognize a declare statement within the header section, enumerating one or more instance variables; and
instantiate the enumerated one or more instance variables for use code sections with at least code statements of the selected one of the first and the second programming language; and
at least one processor coupled to said at least one storage unit to execute said programming instructions.

14. The apparatus of claim 13, wherein the first and second code sections are non-interleaved code sections.

15. The apparatus of claim 13, wherein said second code section is embedded within said first code section.

16. The apparatus of claim 13, wherein said first language is a directive language, and said second language is a selected one of XML and an object-oriented language.

17. The apparatus of claim 13, wherein said first language is an object-oriented language, and said second language is XML.

18. The apparatus of claim 13, wherein the programming instructions further enable the apparatus to
recognize a third code section with at least code statements of a third programming language; and
invoke a third code statement processing unit of the third programming language to process the third code section.

19. The apparatus of claim 18, wherein said third code section is embedded within said second code section, and said second code section is embedded within said first code section.

20. The apparatus of claim 18, wherein said first language is a directive language, said second language is an object-oriented language and said third language is XML.

21. The apparatus of claim 13, wherein said programming instructions further enable the apparatus to
recognize an invocation of a library function of a selected one of the first and the second programming language within the first code section; and
invoke the library function, and output the result of the invocation.

22. The apparatus of claim 21, wherein the library function is a selected one of an emit function for outputting execution results, a pop function for returning an element, and a push function for backing up an insertion point.

23. The apparatus of claim 13, wherein the said programming instructions are further designed to enable the apparatus to
recognize a header section of a selected one of the first and the second programming language;
recognize a directive statement within the header section, enumerating one or more data packages; and
import the enumerated one or more data packages for use by code sections with at least code statements of the selected one of the first and the second programming language.

24. The apparatus of claim 13, wherein said programming instructions are further designed to enable the apparatus to
recognize a header section of a selected one of the first and the second programming language;
recognize a declare statement within the header section, enumerating one or more processing methods; and
instantiate the enumerated one or more processing methods for use within code sections with at least code statements of the selected one of the first and the second programming language.

25. A non-transitory computer-readable medium having instructions stored thereon that, when executed by a processor, cause the processor to implement an execution engine, the instructions comprising:

reading a data processing representation having code sections with code statements of at least a first and a second programming language;
recognizing a first code section with at least code statements of a first programming language;
invoking a first code statement processing unit of the first programming language to process the first code section;
invoking a second code statement processing unit of a second programming language to process a code statement, when the first code statement processing unit locates a code statement of the second programming language within the first code section, and invokes the execution engine recursively;
recognizing a second code section with at least code statements of the second programming language;
invoking the second code statement processing unit of the second programming language to process the second code section; and
invoking the first code statement processing unit of the first programming language to process a code statement, when the second code statement processing unit locates a code statement of the first programming language within the second code section, and invokes the execution engine recursively;
wherein the code statement of the second programming language within the first code section, and the code statement of the first programming language within the second code section, are both within the data processing representation; and
wherein the instructions further comprise
recognizing a header section of a selected one of the first and the second programming language;
recognizing a declare statement within the header section, enumerating one or more instance variables; and
instantiating the enumerated one or more instance variables for use within code sections with at least statements of the selected first and second programming language.

26. The non-transitory computer-readable medium of claim 25, wherein the first and second code sections are non-interleaved code sections.

27. The non-transitory computer-readable medium of claim 25, wherein said second code section is embedded within said first code section.

28. The non-transitory computer-readable medium of claim 25, wherein said first language is a directive language, and said second language is a selected one of XML and an object-oriented language.

29. The non-transitory computer-readable medium of claim 25, wherein said first language is an object-oriented language, and said second language is XML.

30. The non-transitory computer-readable medium of claim 25, wherein the instructions further comprise
recognizing a third code section with at least code statements of a third programming language; and
invoking a third code statement processing unit of the third programming language to process the third code section.

31. The non-transitory computer-readable medium of claim 30, wherein said third code section is embedded within said second code section, and said second code section is embedded within said first code section.

32. The non-transitory computer-readable medium of claim 30, wherein said first language is a directive language, said second language is an object-oriented language, and said third language is XML.

33. The non-transitory computer-readable medium of claim 25, wherein the instructions further comprise
recognizing an invocation of a library function within at least a selected one of said first and second code sections; and
invoking the library function, and outputting the result of the invocation.

34. The non-transitory computer-readable medium of claim 25, wherein the instructions further comprise
recognizing a header section of a selected one of the first and the second programming language;
recognizing a directive statement within the header section, enumerating one or more data packages; and
importing the enumerated one or more data packages for use within code sections with at least statements of the selected first and second programming language.

35. The non-transitory computer-readable medium of claim 25, wherein the instructions further comprise
recognizing a header section of a selected one of the first and the second programming language;
recognizing a declare statement within the header section, enumerating one or more processing methods; and
instantiating the enumerated one or more processing methods for use within code sections with at least statements of the selected first and second programming language.

* * * * *